(12) United States Patent
Deleo

(10) Patent No.: US 9,603,478 B2
(45) Date of Patent: Mar. 28, 2017

(54) COFFEE POD ADAPTER SYSTEM

(71) Applicant: Airflo Distributors Pty Ltd, Broadmeadows (AU)

(72) Inventor: Joseph Deleo, Pascoe Vale (AU)

(73) Assignee: AIRFLO DISTRIBUTORS PTY LTD, Victoria (AU)

( * ) Notice: Subject to any disclaimer, the term of this patent is extended or adjusted under 35 U.S.C. 154(b) by 0 days.

(21) Appl. No.: 14/769,242

(22) PCT Filed: Jan. 31, 2014

(86) PCT No.: PCT/IB2014/000090
§ 371 (c)(1),
(2) Date: Aug. 20, 2015

(87) PCT Pub. No.: WO2014/128542
PCT Pub. Date: Aug. 28, 2014

(65) Prior Publication Data
US 2016/0000254 A1 Jan. 7, 2016

Related U.S. Application Data

(60) Provisional application No. 61/770,059, filed on Feb. 27, 2013.

(30) Foreign Application Priority Data

Feb. 22, 2013 (AU) .............................. 2013900592

(51) Int. Cl.
*A47J 31/06* (2006.01)
*A47J 31/44* (2006.01)
*B65D 85/804* (2006.01)

(52) U.S. Cl.
CPC ....... *A47J 31/0668* (2013.01); *A47J 31/0678* (2013.01); *A47J 31/44* (2013.01); *A47J 31/4403* (2013.01); *B65D 85/8046* (2013.01)

(58) Field of Classification Search
CPC .... A47J 31/44; A47J 31/0668; A47J 34/4403; A47J 31/0678; B65D 85/8046
(Continued)

(56) References Cited

U.S. PATENT DOCUMENTS 3,975,996 A * 8/1976 Vitous ................. A47J 31/0642
99/295
5,327,815 A * 7/1994 Fond .................... A47J 31/0668
99/295
(Continued)

FOREIGN PATENT DOCUMENTS

| CN | 201346129 Y | 11/2009 |
| CN | 202960132 U | 6/2013 |
| CN | 203016697 U | 6/2013 |

OTHER PUBLICATIONS

International Search Report of International Application No. PCT/IB2014/000090 mailed Jun. 26, 2014.

*Primary Examiner* — Thien S Tran
(74) *Attorney, Agent, or Firm* — K&L Gates LLP

(57) ABSTRACT

A system, including: a pod holder mount and a pressure plate mount reciprocally movable relative to one another; and a plurality of interchangeable pairs of pod holders and pressure plates respectively removable receivable in, and fluidly connectable to, the pod holder mount and the pressure plate mount to define an extraction chamber for individual coffee pods; wherein each of the pairs of pod holders and pressure plates are constructed and arranged to define fluid passages that selectively combine with fluid passages in the pod holder mount and the pressure plate mount to provide alternate fluid paths to inject water into, and extract coffee from, individual coffee pods in the extraction chamber in two opposite directions.

20 Claims, 8 Drawing Sheets

(58) Field of Classification Search
USPC ...... 99/279, 283, 295, 315, 323; 426/77, 79, 426/80, 110, 112, 115
See application file for complete search history.

(56) References Cited

U.S. PATENT DOCUMENTS

| | | | | |
|---|---|---|---|---|
| 5,398,595 | A * | 3/1995 | Fond .................. | A47J 31/0668 99/295 |
| 5,649,472 | A * | 7/1997 | Fond .................. | A47J 31/0673 426/433 |
| 2002/0148356 | A1 * | 10/2002 | Lazaris ............... | A47J 31/0668 99/295 |
| 2008/0245236 | A1 * | 10/2008 | Ternite ................ | A47J 31/0668 99/295 |
| 2014/0298999 | A1 * | 10/2014 | Lloret Such ........ | A47J 31/3628 99/295 |

* cited by examiner

C-C

COFFEE POD ADAPTER SYSTEM

CROSS-REFERENCE TO RELATED APPLICATION

This application is the United States National Stage of and claims priority to International Application No. PCT/IB2014/000090, which was filed on Jan. 31, 2014, that claims priority to Australian Application No. 2013900592, which was filed on Feb. 22, 2013, that claims the benefit of U.S Provisional Patent Application Ser. No. 61/770,059, which was filed on Feb. 27, 2013, the disclosures which are incorporated herein by reference in their entirety.

FIELD

The present invention relates to a coffee pod adapter system for coffee pod machines.

BACKGROUND

Coffee pod machines that extract coffee from pre-packaged coffee pods (or capsules) are increasingly popular. Suppliers of coffee pod machines have developed their own proprietary types of coffee pods having specific shapes, sizes, piercing directions, and water injection and coffee extraction directions that match their particular machines. As a result, coffee pods from one supplier cannot be used in coffee pod machines of other suppliers.

A need therefore exists for a solution that addresses or alleviates at least some of the problems described above.

SUMMARY

According to the present invention, there is provided a system, including:

a pod holder mount and a pressure plate mount, at least one of which is reciprocally movable relative to the other; and a plurality of interchangeable pairs of pod holders and pressure plates respectively removable receivable in, and fluidly connectable to, the pod holder mount and the pressure plate mount to define an extraction chamber for individual coffee pods;

wherein each of the pairs of pod holders and pressure plates are constructed and arranged to define fluid passages that selectively combine with fluid passages in the pod holder mount and the pressure plate mount to provide alternate fluid paths to inject water into, and extract coffee from, individual coffee pods in the extraction chamber in two opposite directions.

The pressure plate mount may have a water inlet port and a coffee outlet port, and each pressure plate may have a water connector and a coffee connector that are respectively fluidly connectable to the water inlet port and the coffee outlet port of the pressure plate mount.

The pod holder mount may have two fluid passages, and each pressure plate may have an internal fluid passage and a fluid connector arranged to permit fluid flow through one of the fluid passages in the pod holder mount in one direction while blocking off the other fluid passage in the pod holder mount to prevent fluid flow in the other direction, so as to provide alternate fluid paths in the two opposite directions between the water inlet port and the pressure plate mount.

Each pod holder may have a fluid connector arranged to permit fluid flow through one of the fluid passages in the pod holder mount in one direction while blocking off the other fluid passage in the pod holder mount to prevent fluid flow in the other direction, so as to provide alternate fluid paths in the two opposite directions between the water inlet port and the coffee outlet port of the pressure plate mount.

One or both of each of the pairs of pod holders and pressure plates may be constructed and arranged to selectively pierce individual coffee pods in the extraction chamber in one of the two opposite directions.

Each of the pairs of pod holders and pressure plates may be colour coded to visually indicate compatibility both with one another and individual coffee pods.

The pod holder mount may be reciprocally movable relative to the pressure plate mount by a lever between an open position for loading and unloading individual coffee pods, and a closed position for extracting coffee from individual coffee pods.

The system may further include a pod pusher arranged to eject individual coffee pods from the extraction chamber when the system returns to the open position from the closed position.

Individual pod holders may have internal shapes that correspond to external shapes of individual coffee pods.

The pod holder mount and the pressure plate mount may be supported by a frame that is included in, or operatively connectable to, a coffee pod machine.

The water inlet port of the pressure plate mount may be fluidly connectable to a hot water circuit of the coffee pod machine, and the coffee outlet port is fluidly connectable to a coffee dispensing circuit of the coffee pod machine.

The present invention also provides a coffee pod machine including the above system.

BRIEF DESCRIPTION OF DRAWINGS

Embodiments of the invention will now be described by way of example only with reference to the accompanying drawing, in which.

DETAILED DESCRIPTION

Figure 1:
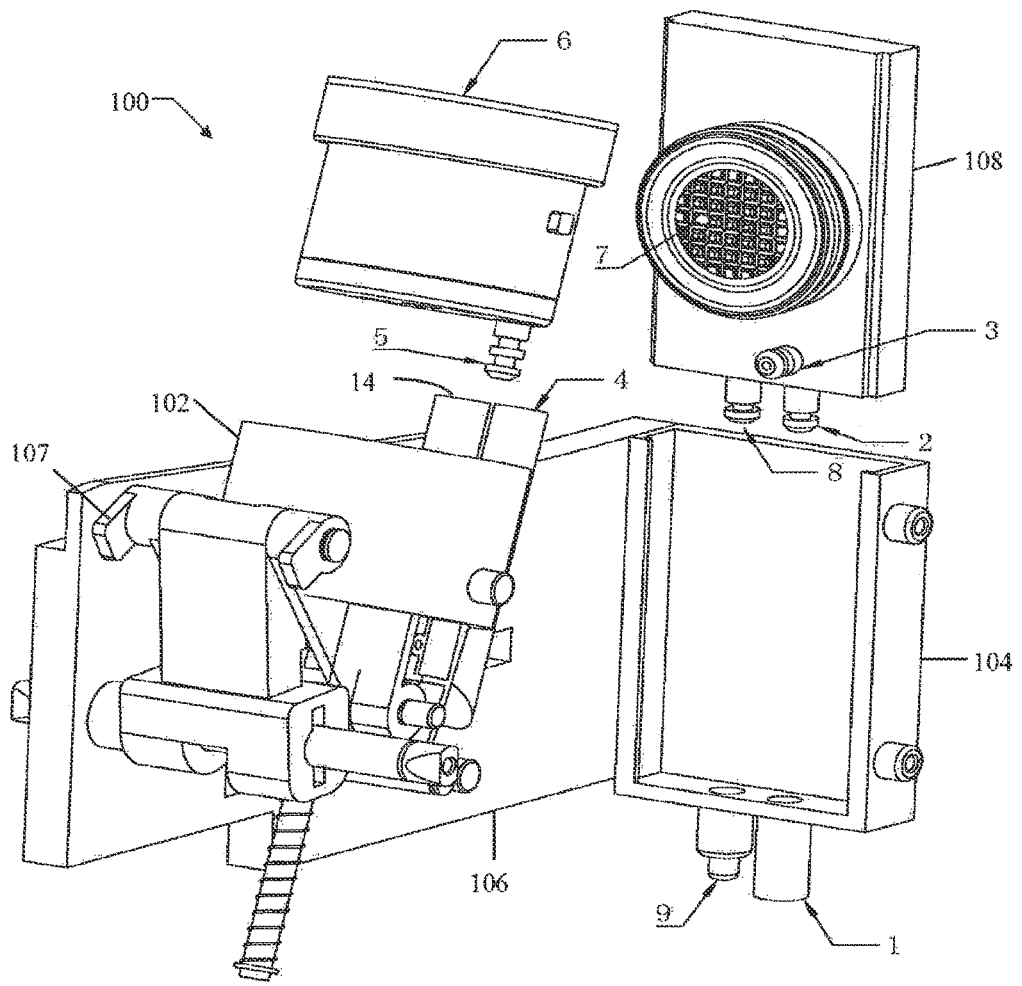
FIG. 1 is a perspective view of a coffee pod adapter system according to an embodiment of the invention in an open position and configured for water and coffee flow in a first direction.
Figure 2:
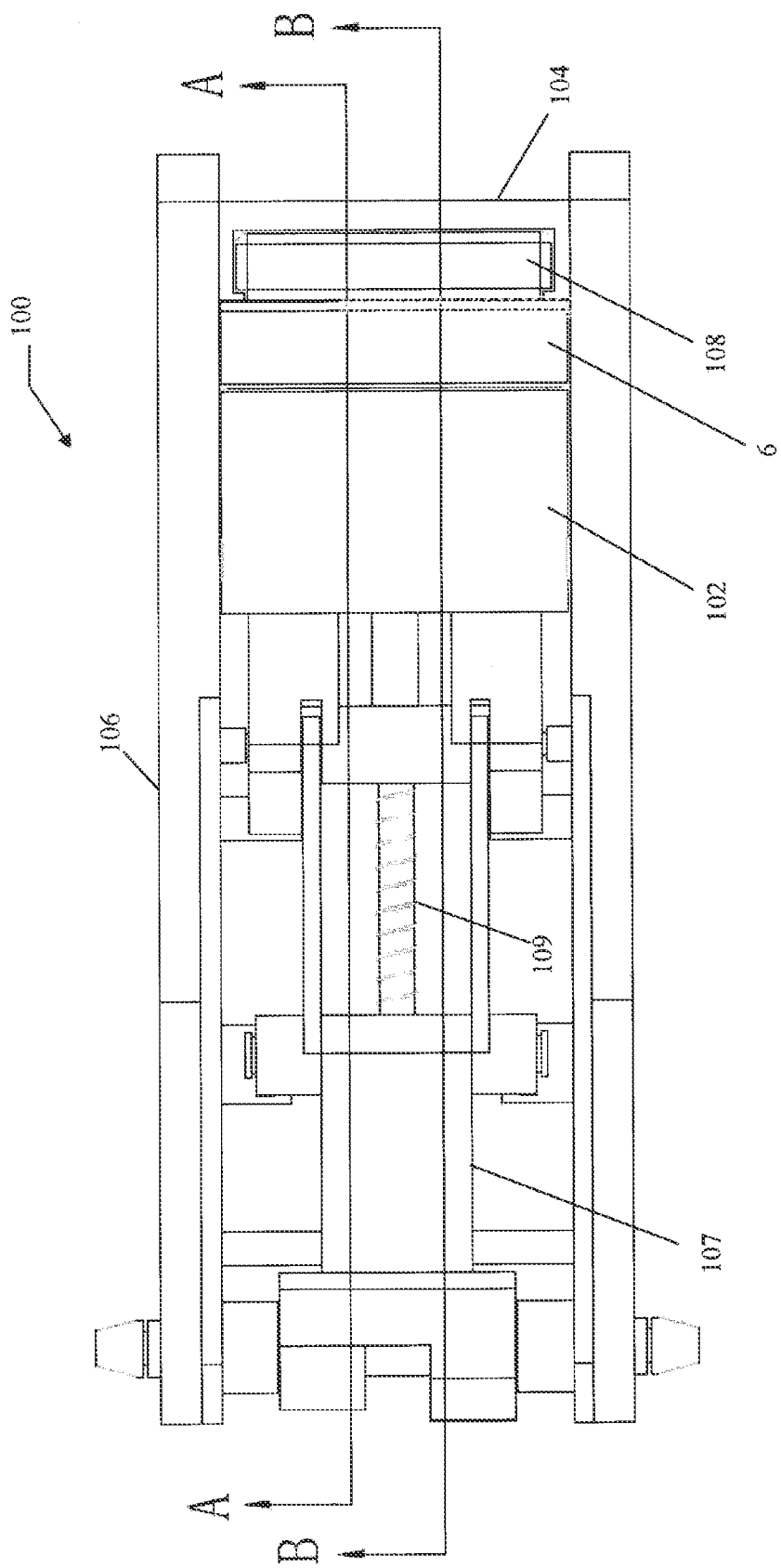
FIG. 2 is a bottom view of the system of FIG. 1 in a closed position.
Figure 5:
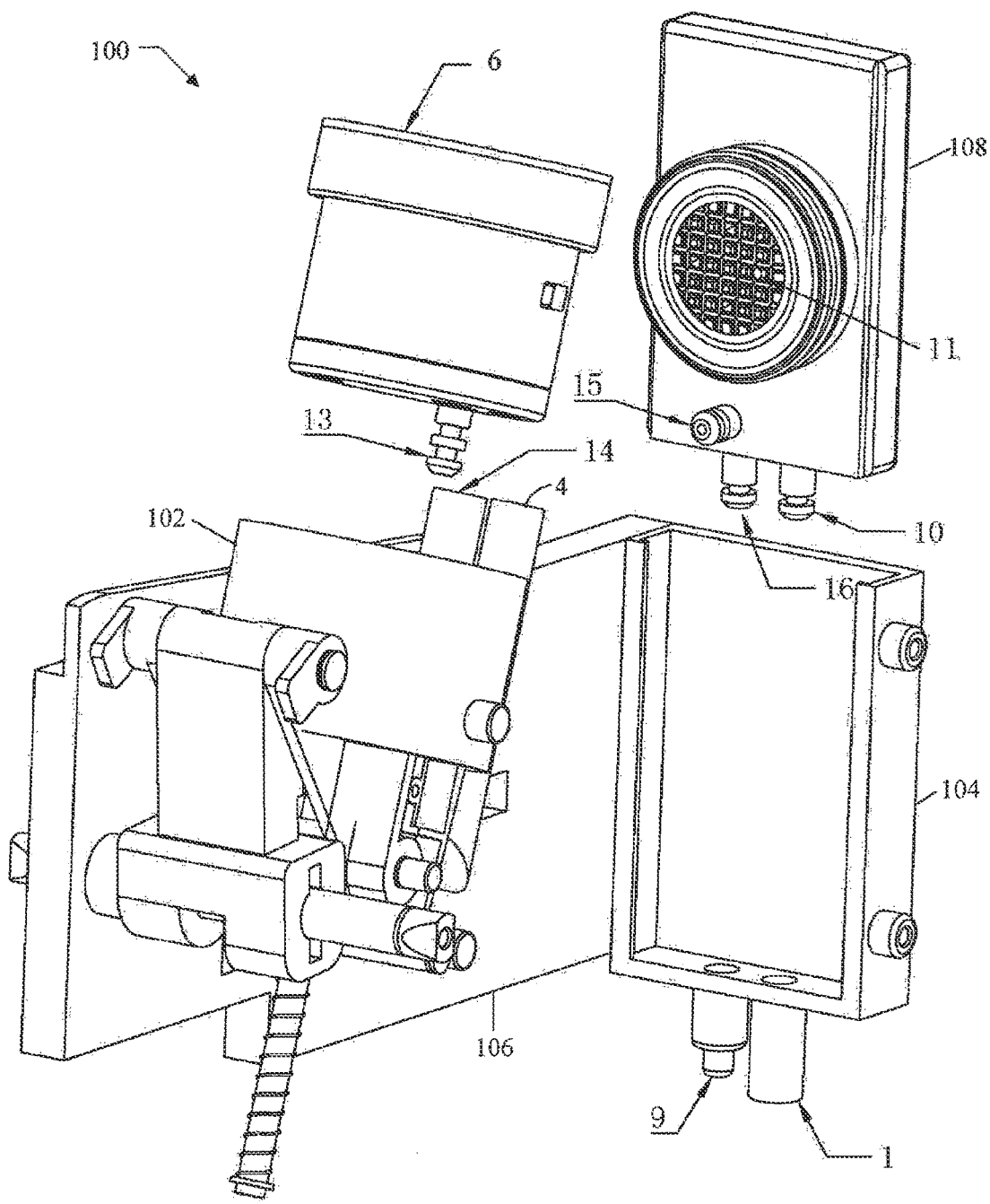
FIG. 5 is a perspective view of the system in an open position and configured for water and coffee flow in a second direction opposite to that in FIG. 1.
Figure 6:
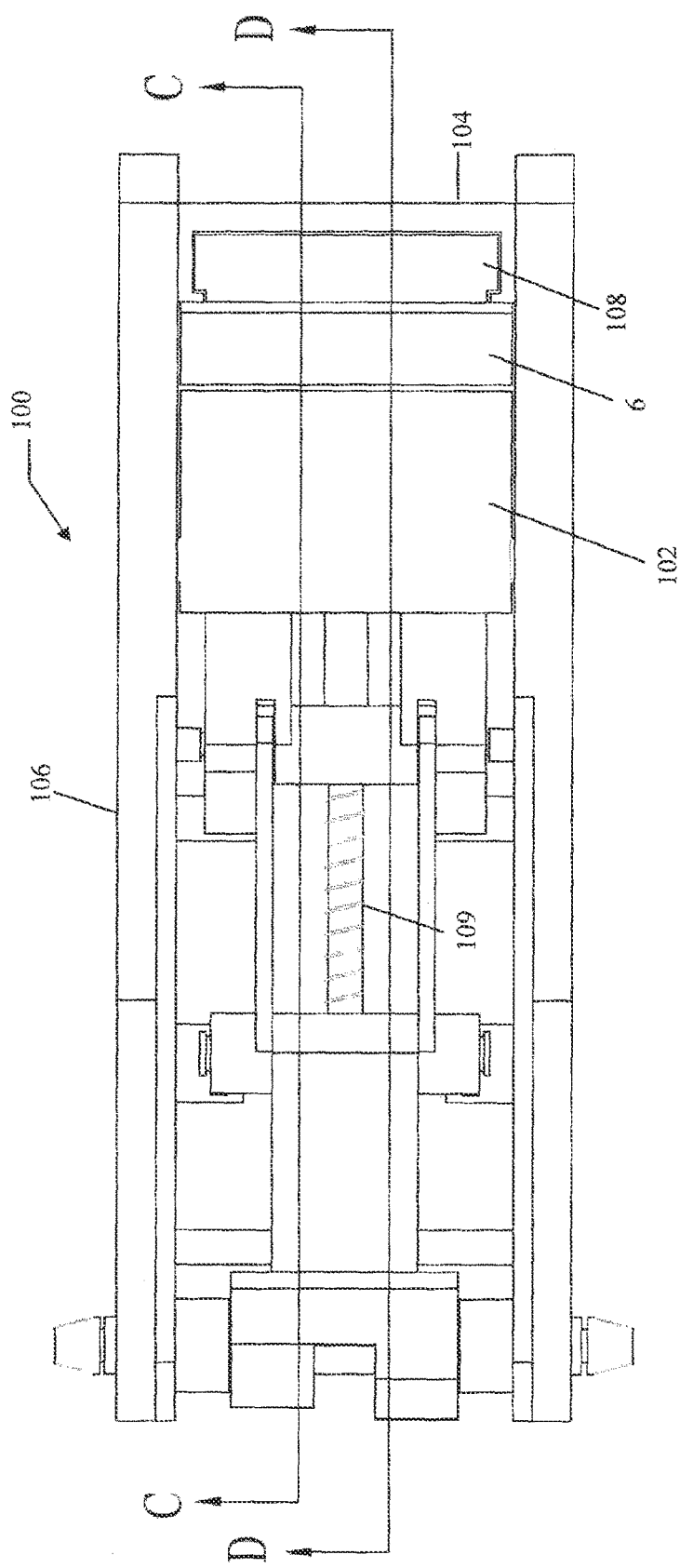
FIG. 6 is a bottom view of the system of FIG. 5 in a closed position.

FIGS. 1 and 5 illustrate a coffee pod adapter system 100 according to an embodiment of the invention in an open position. The system 100 generally includes a pod holder mount 102 and a pressure plate mount 104, at least one of which is reciprocally movable relative to the other. The pod holder mount 102 and the pressure plate mount 104 are supported by a frame (or support cradle) 106 that is included in, or operatively connectable to, a coffee pod machine (not shown). In the illustrated embodiment, the pod holder mount 102 is reciprocally movable (ie, movable forwards and backwards) relative to the pressure plate mount 104, for example by a lever mechanism 107, between the open position for loading and unloading individual coffee pods, and a closed position for extracting coffee from individual coffee pods. Referring to FIG. 2, a pod pusher 109 is operatively connected to the lever mechanism 107 and arranged to eject individual coffee pods when the pod holder mount 102 is retracted to return the system 100 to an open position. Other equivalent arrangements for supporting and reciprocally moving at least one of the pod holder mount 102 and the pressure plate mount 104 relative to one another may also be used.

The system 100 further includes a plurality of interchangeable pairs of pod holders 6 and pressure plates 108 respectively removable receivable in, and fluidly connectable to, the pod holder mount 102 and the pressure plate mount 104 to define an extraction chamber for individual coffee pods. Each of the pairs of pod holders 6 and pressure plates 108 are constructed and arranged to define fluid passages that selectively combine with fluid passages in the pod holder mount 102 and the pressure plate mount 104 to provide alternate fluid paths to inject water into, and extract coffee from, individual coffee pods in the extraction chamber in two opposite directions.

Figure 3:
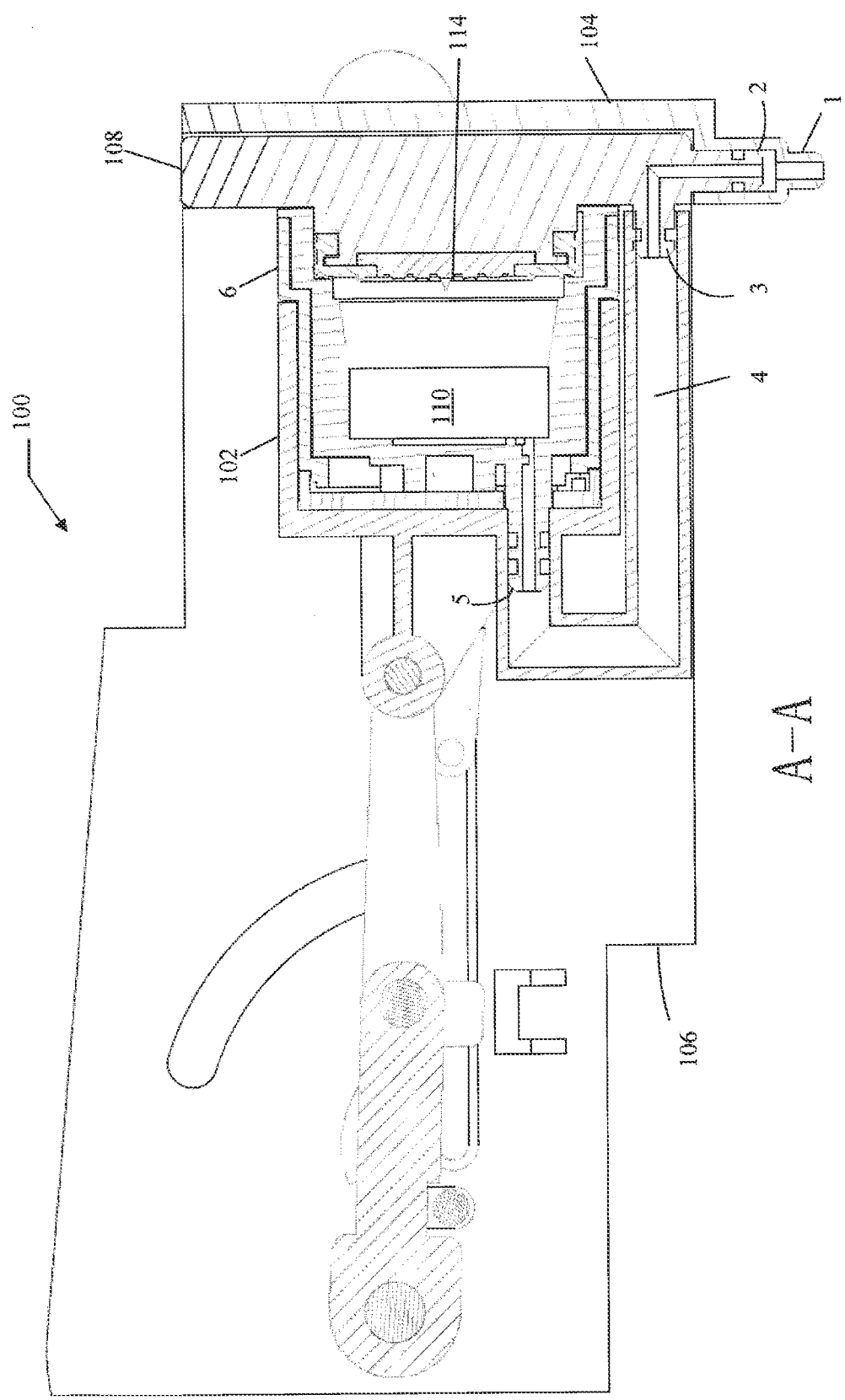
FIG. 3 is a sectional view of the system along lines A-A of FIG. 2.
Figure 4:
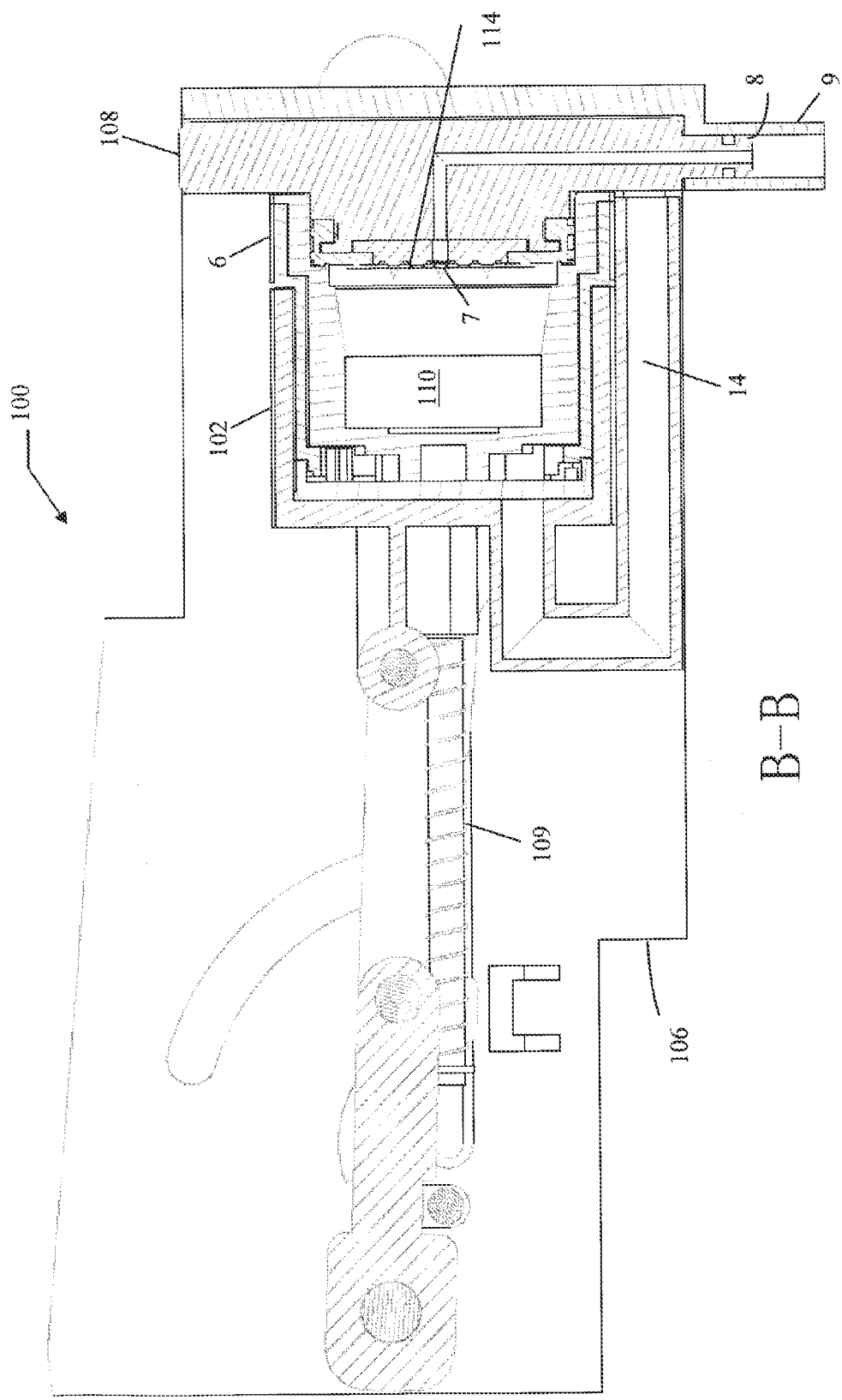
FIG. 4 is a sectional view of the system along lines B-B of FIG. 2.
Figure 7:
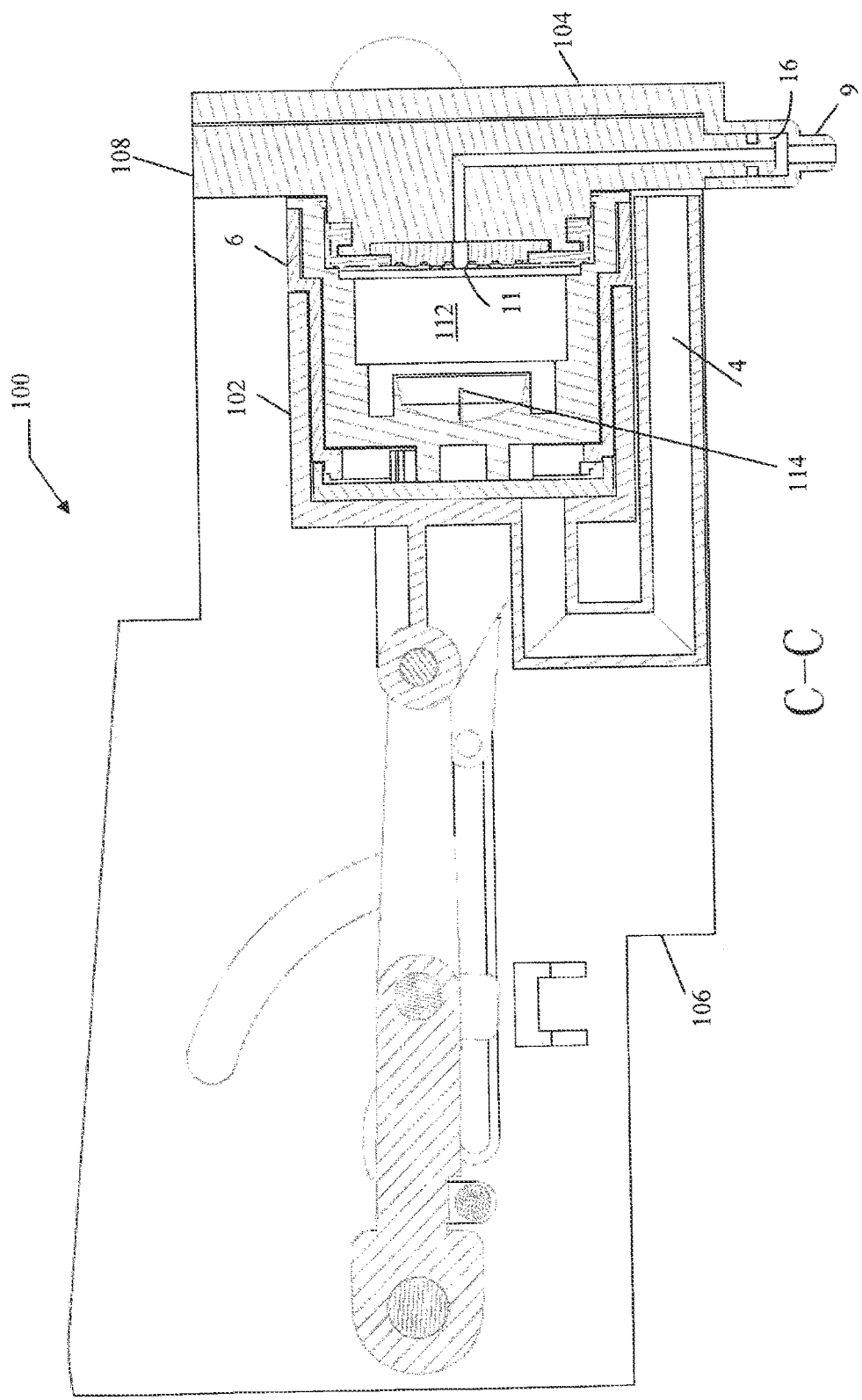
FIG. 7 is a sectional view of the system along lines C-C of FIG. 5.
Figure 8:
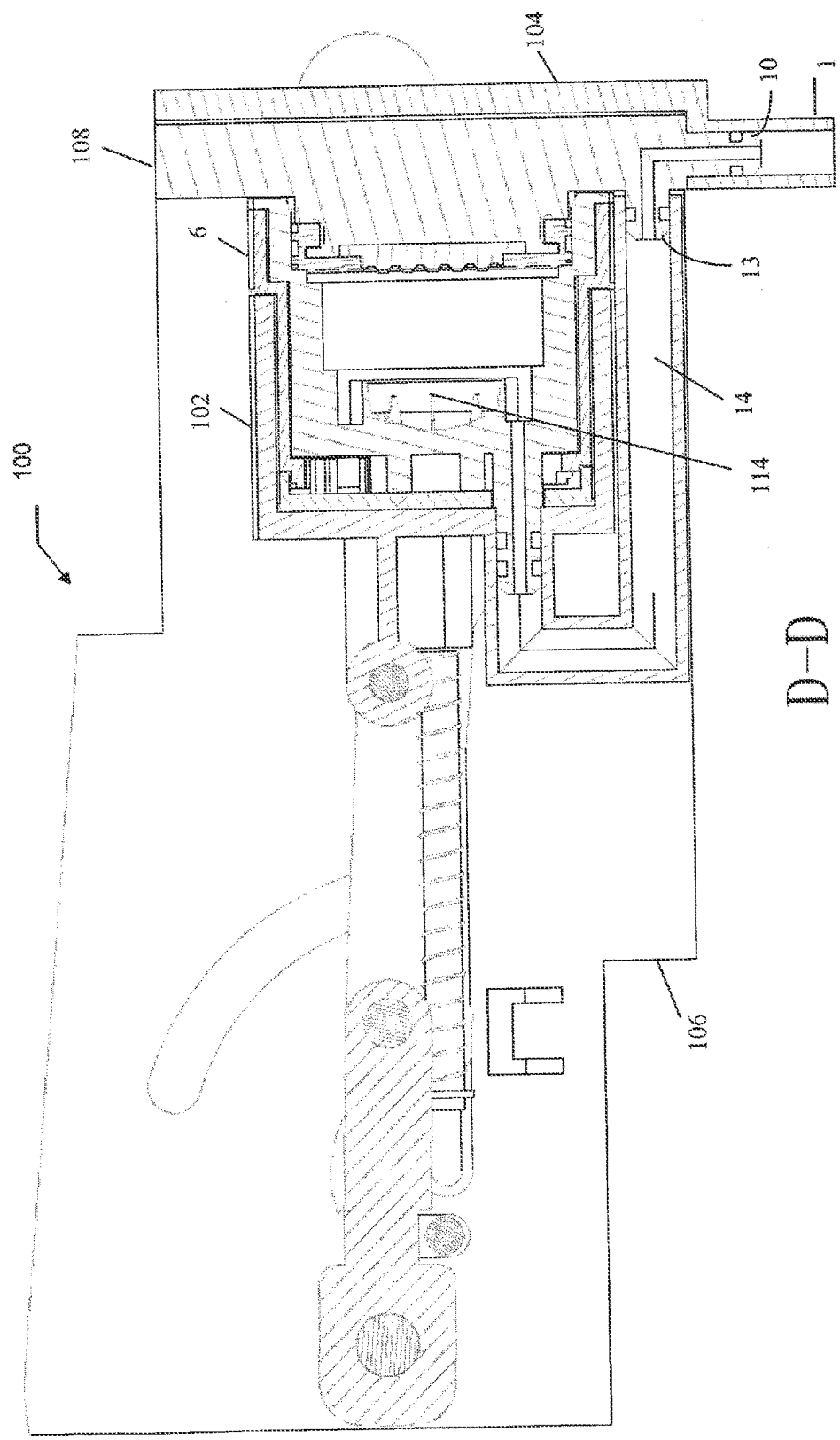
FIG. 8 is a sectional view of the system along lines D-D of FIG. 5.

In addition, each of the pairs of pod holders 6 and pressure plates 108 are constructed and arranged when in the closed position to sealingly enclose individual coffee pods having different corresponding shapes, sizes, piercing directions, and fluid flow directions. The compatibility of each of the pairs of the pod holders 6 and pressure plates 108 to particular types of corresponding or complementary individual coffee pods is visually indicated, for example, by colour coding. Individual pod holders 6 have internal shapes that correspond to external shapes of individual coffee pods. For example, FIGS. 3 and 4 illustrate a pod holder 6 having an external cylindrical shape and an internal shape that corresponds to individual coffee pods 110 having a generally frustoconical external shape. FIGS. 7 and 8 illustrate a different pod holder 6 having an internal shape that corresponds to individual coffee pods 112 having a generally cylindrical external shape.

Furthermore, each of the pairs of pod holders 6 and pressure plates 108 are constructed and arranged to selectively pierce individual coffee pods in the extraction chamber in one of the two opposite directions. For example, piercing elements 114 are selectively provided in or on one or both of the pod holder 6 or the pressure plate 108 of each pair. FIGS. 3 and 4 illustrate piercing elements 114 provided on the pressure plate 108, whereas FIGS. 7 and 8 illustrate piercing elements 114 provided in the pod holder 6.

The alternate fluid paths of the system 100 described above are defined by fluid passages, fluid ports and fluid connectors provided in or on each of the components of the system 100. The pressure plate mount 104 has a water inlet port 1 and a coffee outlet port 9 that are respectively fluidly connectable to a hot water circuit and a coffee dispensing circuit of the coffee pod machine. The direction in which water is injected into, and coffee is extracted from, individual coffee pods is selectively determined by the arrangement of fluid passages and fluid connectors on individual pairs of pod holders 6 and pressure plates 108. For example, the pod holder mount 102 has two alternate fluid passages 4, 14, and each of the pairs of pod holders 6 and pressure plates 108 are constructed and arranged to selectively permit fluid flow through one of the fluid passages in the pod holder mount 102 in one direction while blocking off the other fluid passage in the pod holder mount 102 to prevent fluid flow in the other direction, so as to provide alternate fluid paths in opposite directions between the water inlet port 1 and the coffee outlet port 9 of the pressure plate mount 104.

For example, FIGS. 1 to 4 illustrate the system 100 configured to inject water into, and extract coffee from, frustoconically-shaped coffee pods 110 in the extraction chamber in a first direction through one of the alternate fluid passages 4 in the pod holder mount 102. In this configuration, the pressure plate 108 has an external water connector 2 and an external coffee connector 8 that are respectively fluidly connectable to the water inlet port 1 and the coffee outlet port 9 of the pressure plate mount 104. Referring to FIG. 1, the pressure plate 108 has an external fluid connector 3 that is fluidly connectable to one of two fluid passages 4, 14 in the pod holder mount 102. For example FIG. 3 illustrates that the external fluid connector 3 is fluidly connected to the fluid passage 4 in the pod holder mount 102. The other fluid passage 14 in the pod holder mount 102 is blanked or blocked off by the body of the pressure plate 108 as illustrated in FIG. 4. The open fluid passage 4 of the pod holder mount 102 is fluidly connected to an external fluid connector 5 provided on the pod holder 6. In a closed position, the pod holder 6 is fluidly connected to an internal fluid passage 7 in the pressure plate mount 108. The fluid path for permitting fluid flow in the first direction is completed by an external fluid connector 8 provided on the pressure plate mount 108 that fluidly connects the internal fluid passage 7 to the coffee outlet port 9.

FIGS. 5 to 8 illustrate the system 100 configured to inject water into, and extract coffee from, cylindrically-shaped coffee pods 112 in the extraction chamber in a second direction opposite to the first direction through the other of the alternate fluid passages 4, 14 in the pod holder mount 102. In this configuration, the pressure plate 108 has an external water connector 100 that is fluidly connectable to the water inlet port 1 of the pressure plate mount 104. The pressure plate 108 has an external fluid connector 15 that is fluidly connectable to the fluid passage 14 in the pod holder mount 102, as illustrated in FIG. 8. The other fluid passage 4 in the pod holder mount 102 is blanked or blocked off by the body of the pressure plate 108 as illustrated in FIG. 7. The open fluid passage 14 of the pod holder mount 102 is fluidly connected to an external fluid connector 13 provided on the pod holder 6. In a closed position, the pod holder 6 is fluidly connected to an internal fluid passage 11 in the pressure plate mount 108. The fluid path for permitting fluid flow in the first direction is completed by an external fluid connector 16 provided on the pressure plate mount 108 that fluidly connects the internal fluid passage 11 to the coffee outlet port 9.

Embodiments of the present invention provide a coffee pod adapter system that enables different types of coffee pods to be used in a single coffee pod machine. This useful result is provided by three functional aspects. First, the pod holder is interchangeable with the main injection mechanism, this to fit the different shaped pods into the pod holder. Second, the forward pressure plate, into which the pod is pushed against for extraction of the coffee, is interchangeable. Third, the direction of the water is determined by the channels in the pod holder and pressure plate (or wall), enabling the coffee pod adapter system to control the direction of the water forward or backward to thus give the ability of a two way water injection.

In certain embodiments, the pod holder 6 is a cylindrical-shaped part that fits into the pod holder mount (or injection cradle) 102 to carry the coffee pod 110 forward towards the pressure plate 108. It fits in to the pod holder mount 102 and twists locks into position. As it connects with the pod holder mount 102 cradle and locks, it is lined up with the water inlet path and allows water to pass through it into the pod 110 that it holds. The pod 110 is pieced when positioned into the pod holder 6 allowing the water to pass through, and the dispensing pod pusher 109 passes through it when retracted to eject the used pod 110. The pod holder 6 can be made in any and all shapes and sized and dimensioned to accommodate any type or brand of commercially available coffee pod 110. The interchangeable pressure plate 108 is inserted into the forward part of the coffee machine injection system 100 at the opposite end to the pod holder mount 102. The pressure plate 108 can be interchangeable into many different sizes to accommodate the matching pod holder 6 in size. The pressure plate 108 is inserted into position matching the pod holder 6 and the injection system 100 when in the injected closed position closes the pod holder and pressure plate together forming a sealed chamber for the pod 110, enabling it be injected with hot water for the formation of the coffee.

The two way water system 100 allows the water to selectively inject the pod 110 from the front or the rear. Coffee pods 110 are differently injected directionally. There are two water channels for forward flow and reverse flow in two opposite directions. For forward injection, the pod holder 6 forces the water though the forward water channel to the corresponding pressure plate 108. The water direction is permanently set in one direction through the corresponding water channel and is received through the pressure plate 108 in the same direction forward. The same in reverse, ie the water is forced through the rear channel for the reverse water flow direction to the corresponding pressure plate 108, changing the direction of the water flow enabling the water to inject from the rear.

Coffee pods 110 are injected from the front or from the rear; to inject them differently from their design water direction will cause the failure of injection. The ability to inject both ways ensures the multi pod design will inject the pods 110 correctly as they were designed. The pods 110 are pieced when inserted into the pod holders 6, each version has its own piercing paten which every pod 6 insert is built matching the piercing sequence. The pod holder 6 is inserted into the pod holder mount 102 and locked into position; this will then activate the water direction that is suitable for the pod 110 that is to be injected. The activating lever handle 107 when in the closed position will slide the pod holder 6 forward to the pressure plate 108 and lock into position. When locked the pod 110 is ready to be injected with hot water. Water is then injected into the pod 110 which saturates the coffee and is forced under pressure through the pressure plate. The liquid coffee then proceeds to the coffee dispenser, which in turn dispenses it to the cup. Releasing the locked position with the handle 107 of the pod holder mount 102 will slide the pod holder 6 back into the start position; this will also eject the spent coffee pod 110 with a push rod 109 that passes through the centre of the pod holder 6 pushing the spent pod 110 out into the used pod basket ready for disposal.

When changing to a different brand/shape coffee pod 110, the correct matching pod holder 6 is selected together with the correct matching pressure plate 108, and both parts are inserted into the machine ready for the injecting of that particular pod 110. This will automatically select the correct water channel direction for injecting and the coffee machine is configured for correct injection of that selected pod 110. Water from the boiler is connected through tubes to the pod holder mount 102 and pod holder insert 6 where the two water channels connect to the forward insert or rear insert pod holders 6 for selecting the direction of the water flow which is essential for successful injection. The pressure plate 108 matches the pod holder 6; each pressure plate 108 at its peripheral sealing point has a gasket, which is different in size according to the pod circumference and piecing of the pod method. Each pressure plate 108 is colour coded (or visually indicated by numbers, letters, patterns or colours) to match each pod holder 6, so both are selected as a complementary pair that are matching, for example red pod holder 6 with red pressure plate 108. It is desirable that both correspond as they will have the matching water channels that allow the directional flow of the water. For example, a yellow corresponding pod holder 6 and pressure plate 108 will have their water channels matching for the reverse flow of the water direction.

The above embodiments have been described by way of example only and modifications are possible within the scope of the claims that follow.

The invention claimed is:

1. A system, including:
   a pod holder mount and a pressure plate mount, at least one of which is reciprocally movable relative to the other; and
   a plurality of interchangeable pairs of pod holders and pressure plates respectively removably receivable in, and fluidly connectable to, the pod holder mount and the pressure plate mount to define an extraction chamber for individual coffee pods;
   wherein each of the pairs of pod holders and pressure plates are constructed and arranged to define fluid passages that selectively combine with fluid passages in the pod holder mount and the pressure plate mount to provide alternate fluid paths to inject water into, and extract coffee from, individual coffee pods in the extraction chamber in two opposite directions; and
   wherein the pressure plate mount has a water inlet port and a coffee outlet port, and each pressure plate has a water connector and a coffee connector that are respectively fluidly connectable to the water inlet port and the coffee outlet port of the pressure plate mount.

2. The system according to claim 1, wherein the pod holder mount has two fluid passages, and each pressure plate has an internal fluid passage and a fluid connector arranged to permit fluid flow through one of the fluid passages in the pod holder mount in one direction while blocking off the other fluid passage in the pod holder mount to prevent fluid flow in the other direction, so as to provide alternate fluid paths in the two opposite directions between the water inlet port and the coffee outlet port of the pressure plate mount.

3. The system according to claim 2, wherein each pod holder has a fluid connector arranged to permit fluid flow through one of the fluid passages in the pod holder mount in one direction while blocking off the other fluid passage in the pod holder mount to prevent fluid flow in the other direction, so as to provide alternate fluid paths in the two opposite directions between the water inlet port and the coffee outlet port of the pressure plate mount.

4. The system according to claim 1, wherein one or both of each of the pairs of pod holders and pressure plates are constructed and arranged to selectively pierce individual coffee pods in the extraction chamber in one of the two opposite directions.

5. The system according to claim 1, wherein each of the pairs of pod holders and pressure plates are colour coded to visually indicate compatibility both with one another and individual coffee pods.

6. The system according to claim 1, wherein the pod holder mount is reciprocally movable relative to the pressure plate mount by a lever between an open position for loading and unloading individual coffee pods, and a closed position for extracting coffee from individual coffee pods.

7. The system according to claim 6, further including a pod pusher arranged to eject individual coffee pods from the extraction chamber when the pod holder mount returns to the open position from the closed position to the open position.

8. The system according to claim 1, wherein individual pod holders have internal shapes that correspond to external shapes of individual coffee pods.

9. The system according to claim 1, wherein the pod holder mount and the pressure plate mount are supported by a frame that is included in, or operatively connectable to, a coffee pod machine.

10. The system according to claim 9, wherein the water inlet port of the pressure plate mount is fluidly connectable to a hot water circuit of the coffee pod machine, and the coffee outlet port is fluidly connectable to a coffee dispensing circuit of the coffee pod machine.

11. A coffee pod machine comprising the system according to claim 1.

12. A system comprising:
a pod holder mount defining a plurality of fluid passages, the plurality of fluid passages comprising a first fluid passage and a second fluid passage;
a pressure plate mount comprising an inlet port and an outlet port, wherein the pressure plate mount is movable relative to the pod holder mount or the pod holder mount is movable relative to the pressure plate mount;
a pod holder configured to connect with the pod holder mount; and
a pressure plate comprising a first fluid connector that is configured to connect to the inlet port of the pressure plate mount and a second fluid connector that is configured to connect to the outlet port of the pressure plate mount, wherein the pressure plate is configured to connect to the pod holder mount, and wherein the pressure plate is removably receivable in and configured to connect to the pod holder to define a chamber for a pod; and
wherein, when the pod holder and the pressure plate are connected, a third fluid passage is defined through the pod holder and the pressure plate, wherein the third fluid passage is configured to combine with the plurality of fluid passages of the pod holder mount and the inlet and outlet ports of the pressure plate mount to define an internal fluid passage, wherein the internal fluid passage comprises a first fluid path and a second fluid path, wherein the first fluid path is provided to inject fluid into a pod located in the chamber in a first direction and the second fluid path is provided to extract fluid from the pod located in the chamber in a second direction, wherein the first direction is different from the second direction.

13. The system according to claim 12, wherein the pressure plate is configured to permit fluid flow through the first fluid passage of the pod holder mount and to prevent fluid flow through the second fluid passage of the pod holder mount to provide the internal fluid passage between the inlet port and the outlet port of the pressure plate mount.

14. The system according to claim 12, wherein the pod holder is configured to permit fluid flow through the first fluid passage of the pod holder mount and to prevent fluid flow through the second fluid passage of the pod holder mount to provide the internal fluid passage between the inlet port and the outlet port of the pressure plate mount.

15. The system according to claim 12, wherein at least one of the pod holder or the pressure plate is configured to pierce a pod located in the chamber.

16. The system according to claim 12, wherein at least one of the pod holder or the pressure plate is colour coded to visually indicate compatibility with a pod.

17. The system according to claim 12, wherein the pod holder mount is reciprocally movable relative to the pressure plate mount by a lever, wherein the pod holder mount is reciprocally moveable between an open position and a closed position.

18. A system comprising:
a pod holder mount and a pressure plate mount, at least one of which is reciprocally movable relative to the other; and
a plurality of interchangeable pairs of pod holders and pressure plates respectively removably receivable in, and fluidly connectable to, the pod holder mount and the pressure plate mount to define an extraction chamber for individual coffee pods;
wherein each of the pairs of pod holders and pressure plates are constructed and arranged to define fluid passages that selectively combine with fluid passages in the pod holder mount and the pressure plate mount to provide alternate fluid paths to inject water into, and extract coffee from, individual coffee pods in the extraction chamber in two opposite directions; and
wherein the pressure plate mount comprises a water inlet port and a coffee outlet port, and each pressure plate comprises a water connector and a coffee connector that are respectively fluidly connectable to the water inlet port and the coffee outlet port of the pressure plate mount.

19. The system according to claim 18, wherein the water inlet port of the pressure plate mount is fluidly connectable to a hot water circuit of a coffee pod machine, and the coffee outlet port is fluidly connectable to a coffee dispensing circuit of the coffee pod machine.

20. The system according to claim 18, wherein the pod holder mount is reciprocally movable relative to the pressure plate mount by a lever between an open position for loading and unloading individual coffee pods, and a closed position for extracting coffee from the individual coffee pods.

* * * * *

UNITED STATES PATENT AND TRADEMARK OFFICE
CERTIFICATE OF CORRECTION

PATENT NO. : 9,603,478 B2
APPLICATION NO. : 14/769242
DATED : March 28, 2017
INVENTOR(S) : Joseph Deleo Page 1 of 1

It is certified that error appears in the above-identified patent and that said Letters Patent is hereby corrected as shown below:

In Column 4, Line 39, delete "connector 100" and insert -- connector 10 --, therefor.

In Column 4, Line 51, delete "first" and insert -- second --, therefor.

In Column 5, Line 8, delete "pieced" and insert -- pierced --, therefor.

In Column 5, Line 39, delete "design" and insert -- designed --, therefor.

In Column 5, Line 40, delete "the".

In Column 5, Line 43, delete "pieced" and insert -- pierced --, therefor.

In Column 5, Line 44, delete "paten" and insert -- pattern --, therefor.

In Column 7, Line 22, in Claim 10, delete "claim 9" and insert -- claim 1 --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*